United States Patent
Curry et al.

(10) Patent No.: US 7,701,391 B2
(45) Date of Patent: Apr. 20, 2010

(54) ACQUISITION AND ENCODING OF GPS CODES

(75) Inventors: Samuel J. Curry, Redondo Beach, CA (US); David M. Schwartz, Northridge, CA (US)

(73) Assignee: The Aerospace Corporation, El Segundo, CA (US)

(*) Notice: Subject to any disclaimer, the term of this patent is extended or adjusted under 35 U.S.C. 154(b) by 246 days.

(21) Appl. No.: 11/686,099

(22) Filed: Mar. 14, 2007

(65) Prior Publication Data

US 2008/0224926 A1  Sep. 18, 2008

(51) Int. Cl.
*G01S 1/02* (2006.01)
*H04B 1/00* (2006.01)

(52) U.S. Cl. .................. 342/357.15; 342/357.12; 375/149

(58) Field of Classification Search ........... 342/357.02, 342/357.06, 357.12, 357.15; 701/207, 213; 375/149, 150
See application file for complete search history.

(56) References Cited

U.S. PATENT DOCUMENTS

| | | | |
|---|---|---|---|
| 7,266,750 B1* | 9/2007 | Patapoutian et al. | 714/758 |
| 2003/0033570 A1* | 2/2003 | Khannanov et al. | 714/755 |
| 2007/0177729 A1* | 8/2007 | Reznik et al. | 380/44 |
| 2009/0068953 A1* | 3/2009 | Lee et al. | 455/63.1 |

\* cited by examiner

*Primary Examiner*—Dao L Phan
(74) *Attorney, Agent, or Firm*—Henricks, Slavin & Holmes LLP

(57) ABSTRACT

A method for acquiring Global Positioning System (GPS) code includes describing GPS code as a Low Density Parity Check (LDPC) code, and decoding the LDPC code to achieve acquisition by directly solving for the correct code phase.

14 Claims, 5 Drawing Sheets

Acquisition System

C/A Code Generator

*Figure 1*

20-Stage Equivalent Linear C/A Code Generator

*Figure 2*

C/A Generator With Two Feedback Taps

*Figure 3*

C/A Generator with Three Feedback Taps (1 of 340)

*Figure 4*

Acquisition System

Figure 5

GPS Receiver

*Figure 6*

Communications channel protected by LDPC coding – conventional encoder

*Figure 7*

Communications channel protected by LDPC coding – encoded by shift registers

*Figure 8*

ACQUISITION AND ENCODING OF GPS CODES

TECHNICAL FIELD

The invention relates generally to Global Positioning Systems (GPS) and, in particular, to the acquisition and encoding of GPS codes.

BACKGROUND ART

Acquisition of the GPS Clear/Acquisition (C/A) codes at low signal-to-noise ratio, such as exists inside buildings, is a difficult technical challenge for two basis reasons: (a) the amount of GPS receiver hardware needed to detect the presence of the GPS signal and acquire the C/A code (or alternatively the time needed for acquisition) becomes large as the signal-to-noise ratio decreases toward the theoretical acquisition threshold, as defined by the Shannon limit; and (b) the correlation time over which the GPS receiver is able to process the received noisy signal (which in turn sets the effective signal-to-noise ratio) is limited by the fact that the C/A code has data bit transitions that invert the C/A code, randomly, at intervals of 20 msec.

It would be useful to be able to provide an acquisition technique that addresses one or more of the problems described above. It would also be useful to be able to provide an acquisition technique that can be used by GPS receivers to improve the acquisition of signals in a disadvantaged signal environment, such as inside buildings.

SUMMARY OF THE INVENTION

Techniques and embodiments described herein are directed toward improving the overall efficiency of C/A acquisition (in terms of either the amount of hardware needed, or the acquisition time for a given amount of hardware). In an example embodiment, the strategy used to accomplish this improvement is to describe the C/A code as a low-density parity check code (a type of forward error correction code), rather than a Code Division Multiple Access (CDMA) spreading code as C/A is normally thought of. Describing C/A as a Low Density Parity Check (LDPC) code facilitates the use of existing, highly efficient LDPC decoding algorithms, such as the belief propagation algorithm, to achieve C/A acquisition by directly solving for the correct code phase. This is in contrast to the traditional method of C/A acquisition that relies on a Fast Fourier Transform (FFT)-based correlator to exhaustively search all possible C/A code phases to pick the correct one.

Techniques and embodiments described herein attempt to improve the acquisition threshold by overcoming the problem of underlying data transitions, which, as noted above, limit the received signal coherency to 20 msec. In an example embodiment, this is accomplished by recognizing that the LDPC decoding algorithm can be constructed to determine if received samples of C/A code are inverted (due to underlying data bits) or not-inverted. Furthermore, this determination of inverted vs. not-inverted can be done at a lower signal-to-noise ratio than is needed to decode for the correct C/A phase. In an example embodiment, a strategy to lower the acquisition threshold signal-to-noise ratio includes three basis steps: the received data samples are pre-screened to determine if they are inverted or not-inverted, using a variation of the LDPC decoding algorithm; data samples that are found to be inverted are re-inverted and then added to corresponding non-inverted samples, thereby increasing the effective input signal-to-noise ratio; and, after the effective signal-to-noise ratio has been improved by the pre-screening process, the correct code phase is found by directly decoding the correct phase using the LDPC algorithm.

Techniques and embodiments described herein involve families of forward error correction (FEC) block codes that are embedded in each 1023-chip cycle of every GPS C/A code. These FEC codes are intrinsic to the C/A codes by virtue of the Gold code generators used to generate the C/A code. Other Gold codes besides C/A will have these embedded block codes, as will the more general class of product codes. By way of example, these embedded block codes can serve as the basis for constructing other efficient C/A acquisition techniques, as well as facilitate the efficient construction of encoders for LDPC codes. Currently LDPC encoders require complexity that is comparable to LDPC decoders. A simple encoder based on product code generators would be more efficient than existing LDPC encoding algorithms.

In an example embodiment, a method for acquiring Global Positioning System (GPS) code includes describing GPS code as a Low Density Parity Check (LDPC) code, and decoding the LDPC code to achieve acquisition by directly solving for the correct code phase.

In an example embodiment, a method for acquiring Direct Sequence Spread Spectrum codes code includes describing Direct Sequence Spread Spectrum codes as Low Density Parity Check (LDPC) codes, and decoding the LDPC codes to achieve acquisition by directly solving for the correct code phase.

In an example embodiment, a method for protecting communications channel data includes providing information bits from a data source, and using a Low Density Parity Check (LDPC) encoder that includes a shift register to process the information bits and output LDPC codewords to a communications channel.

DISCLOSURE OF INVENTION

Techniques and embodiments described herein exploit certain properties of Gold codes, including the GPS Clear/Acquisition (C/A) codes, relating to their intrinsic error correction features. These error correction features can be used to implement strategies described herein for detection and synchronization of the C/A code in navigation applications. An example embodiment involves a method of representing the GPS C/A spreading code as a low-density parity check (LDPC) code. Also described herein, a strategy using existing LDPC decoding algorithms can be used to achieve C/A acquisition rapidly and at low signal-to-noise ratios. A method of reducing the threshold signal-to-noise ratio for C/A code acquisition below that required by conventional C/A code acquisition techniques is also described herein. This acquisition technique can be used by GPS receivers to improve the acquisition of signals in a disadvantaged signal environment, such as inside buildings.

Techniques and embodiments described herein exploit forward error correction block codes that are embedded in Gold codes, using the GPS C/A code as an example. These embedded block codes can be used as the basis for constructing new acquisition algorithms. A second separate application is the use of these embedded codes to construct families of forward error correcting block codes for communication applications.

Introduction

Conventionally, the most efficient method of implementing C/A code acquisition is FFT-based correlation, which tends to be hardware intensive at low signal-to-noise ratios. In contrast, the techniques and embodiments described herein address C/A code acquisition as a decoding problem, and this enables an alternative approach to C/A acquisition that is faster (more efficient) and able to work at lower signal-to-noise ratios.

Figure 1:
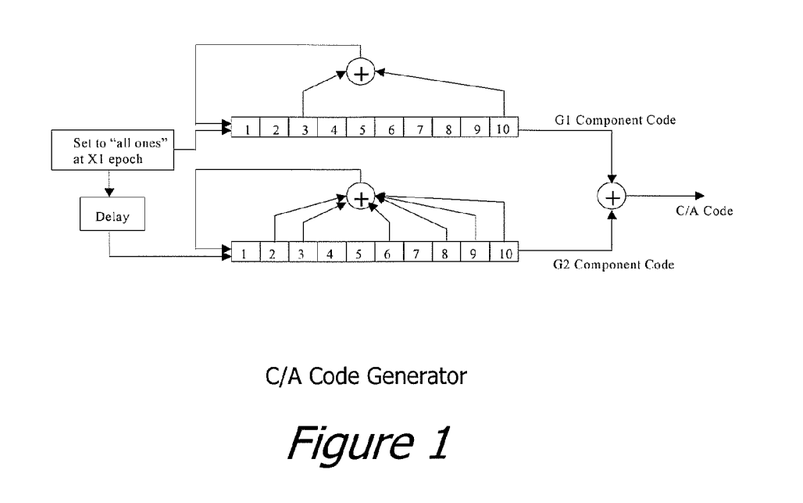
FIG. 1 shows an example of a C/A code generator.

FIG. 1 shows a block diagram of a C/A code generator, which includes two 10-stage feedback shift registers, with the outputs of these registers summed (modulo-2) to form the C/A code. There are 32 such C/A codes used by the GPS system. All 32 codes have the same structure in terms of the generator polynomials of the component G1 and G2 codes, and the only difference is the initial fill word (or initial phase) of the G2 register. The initial fill of the G1 register is set to "all ones" at the beginning of the GPS X1 epoch, a GPS system-wide time reference. The feedback taps on the two shift registers were selected to provide a resulting C/A code that is a member of the Gold code family.

Equivalent Linear C/A Code Generators

It follows directly from FIG. 1 that the generator polynomials for the component codes G1 and G2 are given by:

$$g_1(x)=1+x^3+x^{10}$$

$$g_2(x)=1+x^2+x^3+x^6+x^8+x^9+x^{10}$$

It also follows that the generator polynomial for the C/A code is given by the product of $g_1(x)$ and $g_2(x)$.

$$C(x)=g_1(x)*g_2(x)=1+x^2+x^5+x^8+x^{11}+x^{16}+x^{18}+x^{19}+x^{20}$$

Figure 2:
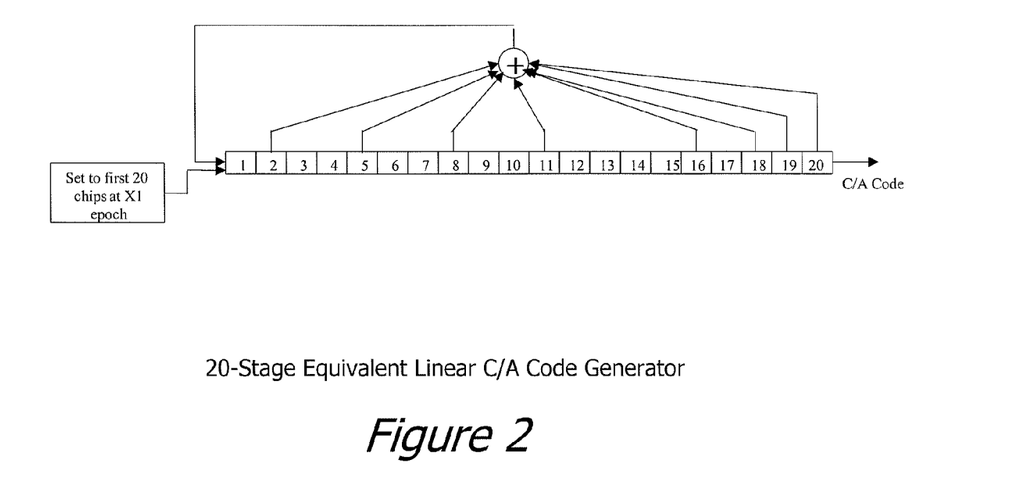
FIG. 2 shows an example of a 20-Stage Equivalent Linear C/A Code Generator.

From this generator polynomial it follows that an equivalent way to generate the C/A code is with one 20-stage linear shift register, as shown in FIG. 2. If the initial fill of this shift register is set to the first 20 chips of a particular C/A code at the beginning of the GPS X1 epoch, then the shift register of FIG. 2 will generate that C/A code, even though it has a different structure than the original generator shown in FIG. 1. Any one of the 32 possible C/A codes can be generated with this 20-stage shift register; the particular code is determined entirely by the initial fill of 20 C/A chips.

Linear C/A Generator with Two Feedback Taps

Figure 3:
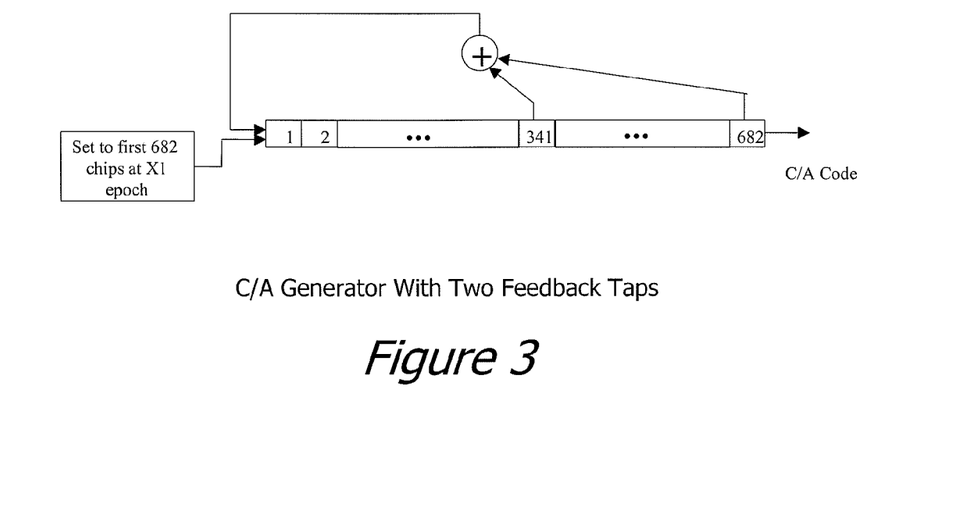
FIG. 3 shows an example of a C/A Generator With Two Feedback Taps.

Techniques and embodiments described herein utilize other equivalent linear generators that have the minimum number of feedback taps. FIG. 3 shows an example embodiment of a linear shift register configurations with a low number of feedback taps that generate C/A. In this example embodiment, the linear generator has two feedback taps, and the shift register has length 682 C/A chips.

This shift register will generate the C/A code if the register is initially loaded with any segment of 682 consecutive chips of the C/A code. The polynomial for this realization of the C/A code generator is $$C(x)=1+x^{341}+x^{682} \qquad \text{Eqn (1)}$$

Eqn (1) reveals an interesting property of the C/A code, namely that the C/A chips must satisfy the following parity check relationship:

$$C_n+C_{n+341}+C_{n+682}=0 \qquad \text{Eqn (2)}$$

where $C_n$ is any n-th chip in the C/A code and the addition is modulo-2.

Thus, this 2-tap code generator defines a number of parity check relationships on the C/A chips. For one cycle of C/A (1023 chips), the parity check given by Eqn (2) must be satisfied for each chip position, n, between 0 and 1022. Thus, the generator polynomial of Eqn (1) leads to the definition of 341 independent parity check equations over one cycle of the C/A code.

Linear C/A Generators with Three Feedback Taps

Other example embodiments utilize linear C/A generators with three feedback taps (340 such generators have been found), each having the form $$C(x)=1+x^k+x^l+x^m \qquad \text{Eqn (3)}$$

This polynomial corresponds to a shift register with feedback taps located at stages k, l, and m.

Corresponding to this polynomial, the following parity check condition must be satisfied for chip positions, n:

$$C_n=C_{n-k}+C_{n-l}+C_{n-m}$$

This leads to the following parity check condition:

$$C_n+C_{n+m-k}+C_{n+m-l}+C_{n+m}=0 \qquad \text{Eqn (4)}$$

The values of m, m−k, and m−l that satisfy this equation are listed in Appendix 1. There are 340 such combinations that correspond to the 340 three-tap linear C/A generators that were found with an exhaustive search algorithm. For example, one of the three-tap C/A generators has the generator polynomial $$C(x)=1+x^{499}+x^{895}+x^{899} \qquad \text{Eqn (5)}$$

Figure 4:
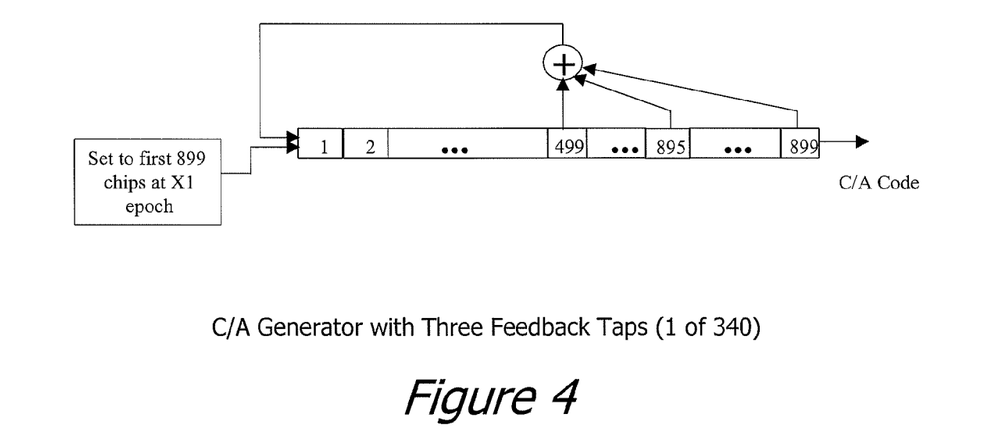
FIG. 4 shows an example of a C/A Generator With Three Feedback Taps.

FIG. 4 shows the shift register generator for this particular polynomial. This polynomial requires that every code chip, Cn, must satisfy the parity check condition $$C_n+C_{n-499}+C_{n-895}+C_{n-899}=0$$

or, equivalently, $$C_n+C_{n+4}+C_{n+400}+C_{n+899}=0 \qquad \text{Eqn (6)}$$

Eqn (6) defines 1023 parity checks that the C/A code chips must satisfy, one for each choice of n. There are 340 such unique generator polynomials, each of which defines 1023 parity checks within the code cycle, one for each choice of n between 0 and 1022

Low-Density Parity Check Code Representation of C/A

As shown above, each cycle of the C/A code must satisfy 341 parity checks involving three terms, and a much larger number of parity checks involving four terms. These parity checks are used to describe C/A as a low-density parity check (LDPC) block code and to derive a parity check matrix. LDPC codes were originally described by Gallager (see, Robert G. Gallager, "Low-Density Parity-Check Codes", MIT Press, 1963, incorporated herein by reference), and re-discovered by MacKay (see, David J. C. MacKay and Radford M. Neal, "Near Shannon Limit Performance of Low Density Parity Check Codes", Electronic Letters, vol. 32, pp. 1645-1646, Jul. 12, 1996, incorporated herein by reference).

The advantage of describing C/A as a LDPC code is that this allows the use of well-known efficient LDPC decoding algorithms, such as the "belief propagation algorithm" (see, David J. C. MacKay and Radford M. Neal, "Near Shannon Limit Performance of Low Density Parity Check Codes", Electronic Letters, vol. 32, pp. 1645-1646, Jul. 12, 1996 and Bernhard M. J. Leiner, "LDPC Codes, a brief Tutorial", Apr. 8, 2005, both incorporated herein by reference), to solve directly for the C/A codeword. By correctly decoding the first 20 chips of the C/A code, C/A can be regenerated with the correct phase using the shift register of FIG. 2. Thus, decoding the first 20 chips is equivalent to code acquisition. Appendix 2 describes how to derive a parity check matrix, H, which has either three or four terms in each row, i.e., a low-density parity check matrix. The H matrix derived in Appendix 2 has 1021 rows, and most (but not necessarily all) are linearly independent.

A procedure for constructing the H matrix is described in Appendix 2. The first 341 rows of H consist simply of the three-term parity checks defined by Eqn (2). The other 680 rows consist of four-term parity checks as described in Appendix 2.

An interesting feature of the parity check matrix, H, is that the same matrix can be used to detect and acquire any of the 32 GPS C/A codes. This follows from the fact that all C/A codes have the same generator polynomial. This feature is useful because it allows a single decoding operation to determine whether any of the 32 GPS codes are present. A GPS receiver usually does not know the exact RF frequency that signals are using (due to both Doppler shift and receiver oscillator instability). Thus, much of the acquisition time is wasted searching empty Doppler bins. Using the LDPC decoding technique allows a Doppler bin to be searched for all 32 GPS C/A codes with a single decoding operation. This is a potential advantage over the conventional correlation acquisition technique that searches for individual C/A codes.

In other situations, the objective may be to acquire a specific C/A code in a CDMA environment. The strategy in such situations is to detect and acquire the strongest C/A code using a generalized H matrix that applies to all 32 C/A codes. After the strongest code is decoded, the H matrix can be changed so that it excludes the C/A code that has already been found and decodes the next-strongest C/A code. Appendix 2 describes how to construct an H matrix to discriminate against a previously found C/A code.

Another feature of the H matrix is that it is that there are many H matrices that can be derived. This feature could be useful. Because the LDPC decoding algorithm is iterative, using simple randomized row-shift operations, a different H matrix can be used for each stage of the iteration. This randomizes the decoding errors in much the same way that interleaving between decoding iterations does in turbo decoding, and may lead to better performance of the decoding algorithm as compared to a conventional LDPC decoder. The H matrix has the property that all rows have either 3 or 4 non-zero terms. Once this H matrix is defined, one can decode the C/A code using the iterative "belief propagation" algorithm for low-density parity check codes.

Extending the SNR Threshold for C/A Acquisition

There is much interest within the GPS navigation community in acquiring the C/A code in disadvantaged environments, such as inside buildings, where the signal-to-noise ratio is very low. The theoretical limit on SNR threshold for C/A acquisition is set by the fact that the RF phase of the C/A waveform is coherent only over a short time interval, and thus coherent correlation can be done only over a limited time span. Phase coherence is limited by the following factors:

The C/A waveform has underlying data, which causes random phase inversions at intervals of 20 ms (20 C/A code cycles).

The C/A waveform is subjected to a Doppler shift that causes uncertainty in the received carrier frequency.

These factors limit the dwell time of a coherent correlation detector to a fraction of the 20 ms data bit interval. A conventional correlator typically dwells over about 4 ms, corresponding to 4 C/A code cycles. One can show that the Shannon limit for C/A code acquisition based on 4 coherent C/A cycles is approximately $E_c/N_o = -27$ dB, where $E_c$=energy per C/A chip. Of course, this theoretical limit must be de-rated by several dB to account for implementation losses, so, the practical SNR threshold for a traditional correlation detector using 4 C/A cycles is in the range −20 to −25 dB. Note that if there were no phase inversions due to the factors listed above, much longer coherent integration times could be used and the threshold signal-to-noise ratio for acquisition could be much lower.

Even after allowing for the factors discussed above, it is possible that the error correction features of the C/A code can be used to lower the signal-to-noise threshold for C/A acquisition. First, consider the three-term parity checks defined by Eqn (2):

$$C_n + C_{n+341} + C_{n+682} = 0$$

If the C/A code is inverted (due to a data bit inversion, for example) then these 340 parity checks are no longer satisfied. Using parity checks with odd numbers of terms allows estimating whether a given segment of the C/A code is (a) not inverted, (b) inverted, or (c) so ambiguous that it should not be used.

An H matrix can be constructed that has an odd number of terms in each row, and this matrix can be used to determine if a segment of C/A code is inverted or not. With this H matrix, all parity checks will fail if the code is inverted, will pass if the code is not inverted, and will be ambiguous if a data transition occurs in the middle of the data samples. The premise behind this approach is that it should be possible to determine whether the C/A sequence is inverted at a lower signal-to-noise ratio than is needed for acquisition, because: (a) the approach involves trying to decode one bit of information (inverted or not-inverted) vs. 10 bits of information for acquisition, and (b) utilization of the fact that phase inversions are spaced exactly 20 code cycles apart. Using an H matrix having an odd number of terms in each row facilitates pre-screening segments of the C/A code prior to acquisition to determine if they have undergone an RF phase inversion. For example, invert-and-add the code samples that fail the parity test, simply add the samples that pass the parity test, and ignore the segments that are ambiguous. In this way, the pre-detection SNR of the C/A code can be coherently increased. This is a potential strategy for reducing the SNR threshold for C/A acquisition.

Embedded Block Codes

There are other features of the GPS C/A code (and other product codes) that should be noted, although they are not necessarily used in the C/A acquisition strategy described herein.

In considering a single cycle of the C/A code (1023 chips), it is possible to identify a large number of FEC block codes embedded within the C/A sequence. These codes can be constructed by repeated application of the parity check conditions derived previously, namely, Eqns (2) and (4).

For example, consider the following subset of 15 C/A chips, starting with any arbitrary chip position, n:

$$C_n \; C_{n+4} \; C_{n+37} \; C_{n+59} \; C_{n+217} \; C_{n+341} \; C_{n+345} \; C_{n+378}$$
$$C_{n+400} \; C_{n+558} \; C_{n+682} \; C_{n+686} \; C_{n+719} \; C_{n+741}$$
$$C_{n+899}$$

For any initial chip position, n, within the 1023 C/A code, the sub-set of 15 chips listed above form a (15, 6) block code with minimum Hamming distance between codewords of 6. Thus, this code can correct double errors and detect triple errors. The sub-set of 15 chips listed above is just one example of a large number of unique (15, 6) block codes that can be identified as existing within one C/A code cycle. It turns out that for each value of n there are 85 unique (15, 6) block codes that can be identified within the 1023 chip C/A code cycle.

Also, there are large numbers of (63, 12) block codes embedded within a C/A code cycle having minimum Hamming distance 24 that can correct up to 11 errors and detect up to 12 errors. There are several interesting things about these embedded codes:

- They are good codes in terms of minimum Hamming distance, although not quite as good as the most powerful known block codes, such as BCH codes
- A low-density parity check matrix can be constructed for them.
- They can be decoded with existing efficient interative algorithms.
- The encoding operation for these codes is simple because they can be generated with shift registers Thus, techniques and embodiments described herein relate to a strategy for C/A code acquisition based on describing C/A as a low-density parity check code. As noted above, Appendix 2 shows how to construct a 1021×1023 parity check matrix that applies to all 32 GPS C/A codes. This parity check matrix has the property that each row contains either 3 or 4 non-zero terms. LDPC codes have efficient, powerful decoding algorithms that can be used to find the first 20 code chips, and thus acquire the C/A code phase. One decoding algorithm that can be used is the belief propagation algorithm for LDPC codes. Also, techniques and embodiments described herein relate to a strategy for extending the SNR threshold for acquisition that involves pre-screening segments of the C/A code for phase inversion.

The fact that the parity check matrix can be randomized between iterations of the LDPC algorithm might help overcome the relatively short length of the C/A code (1023 code chips), compared to the typical LDPC block length of 10,000 or greater.

Figure 5:
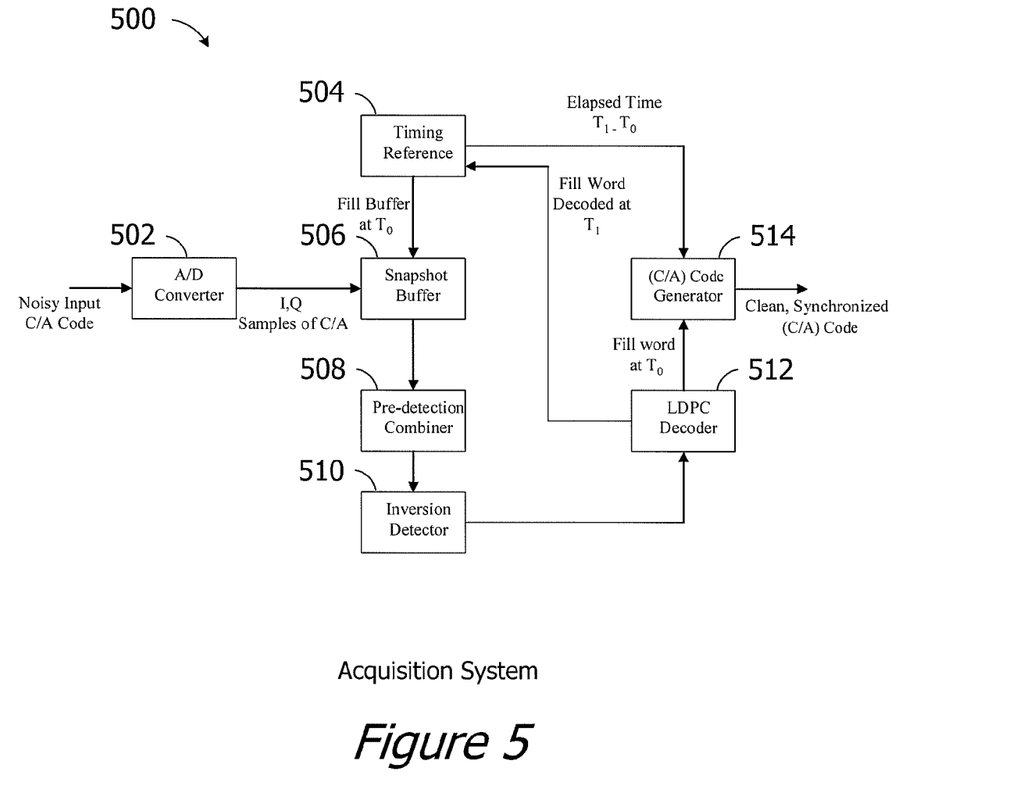
FIG. 5 is a block diagram of an example embodiment of an acquisition system.

Referring to FIG. 5, in an example embodiment, an acquisition system 500 includes an A/D converter 502, a timing reference 504, a snapshot buffer 506, a pre-detection combiner 508, an inversion detector 510, a LDPC decoder 512 and a C/A code generator 514, configured as shown.

By way of example, the input to the acquisition system 500 is a noisy C/A code provided by a GPS receiver (not shown in this figure). The GPS receiver has been tuned to a particular frequency search bin that may contain one or more C/A codes. The SNR of the input signal may be very low, and the receiver may not know which of the 32 possible C/A codes is present in this frequency bin.

The A/D converter 502 digitizes the input signal by taking at least 2 samples per C/A code chip. Since the RF phase of the input signal has not been resolved at this point, the A/D converter 502 takes I and Q samples to preserve the phase information.

The timing reference 504 has two main functions: (a) it commands the snapshot buffer 56 to store a snapshot of the received signal samples beginning at time $T_0$, and (b) it keeps track of the time that elapses between $T_0$, the time when the snapshot begins, and $T_1$, the time when the code chips stored in the snapshot memory have been successfully determined. The timing reference 504 counts the number of C/A code chips that occur between $T_0$ and $T_1$, and tells the local C/A code generator 514 how many extra clock cycles to advance the generator to compensate for the delay between $T_0$ and $T_1$.

The snapshot buffer 506 stores digitized I and Q samples of the input data, beginning at time $T_0$, as commanded by the timing reference 504. The length of this time snapshot is selectable, but in most cases it will correspond to 20 C/A code cycles, or 20460 C/A code chips.

The pre-detection combiner 508 reads samples out of the snapshot buffer 506 and adds samples spaced by exactly 1 C/A code cycle. It does this to improve the SNR prior to attempting to solve for the code chips. In an example embodiment, the pre-detection combiner 508 adds samples over 10 code cycles and forms an "overlay" code, where each chip of the overlay code is the sum of 10 chips (spaced by exactly 1 code cycle) from the snapshot buffer 506. One cycle of the overlay code is simply the sum of 10 cycles of the original code stored in the snapshot buffer 506.

The inversion detector 510 determines whether the overlay code has been inverted. Inversion may occur due to the 50 bps data that modulates the C/A code, or due to drift in the RF phase. If the inversion detector 510 determines that inversion has occurred in either I or Q components of the overlay code it re-inverts the samples so that non-inverted samples are provided to the LDPC decoder 512.

The LDPC decoder 512 solves for the actual C/A code chips. If the LDPC decoder 512 can successfully decode 20 consecutive C/A code chips, these 20 chips can be used to initialize the local C/A generator 514. The LDPC decoder 512 sends the 20 chips to the code generator 514 at time $T_1$ and sends $T_1$ to the timing reference 504.

The local C/A code generator 514 uses the 20 consecutive code chips provided by the LDPC decoder 512 as an initial fill word to start generating the C/A code that corresponds to the data stored at time $T_0$. The local C/A code generator 514 then receives the timing difference $T_1-T_0$ from the timing reference 504 and adds extra clock cycles to catch up with the current phase of the received C/A. At this point, the code generator 514 is producing a clean copy of the C/A code that is aligned in time with the noisy received C/A code. Code acquisition has been achieved.

Employing the techniques and embodiments described herein, it should be possible to acquire the C/A code down to $E_c/N_o=-21$ dB. The threshold is determined by the threshold for detecting sequence inversions, which is $E_c/N_o=-21$ dB. At this input SNR, the LDPC decoder 512 will be operating on a 10-cycle overlay code that has an SNR of −11 dB, which is well above the threshold for LDPC decoding.

It should be appreciated that the principles described herein are applicable to the acquisition of all Gold codes and, still more generally, to the acquisition of product codes.

GPS Receiver Implementation

There is great interest within the GPS navigation community in minimizing the amount of hardware needed for GPS receivers. There is probably even more interest in reducing the threshold signal-to-noise ratio needed for acquisition. For example, there is great interest in having GPS receivers work reliably inside buildings, driven in part by the desire to provide automatic location for 911 calls made from inside buildings.

Figure 6:
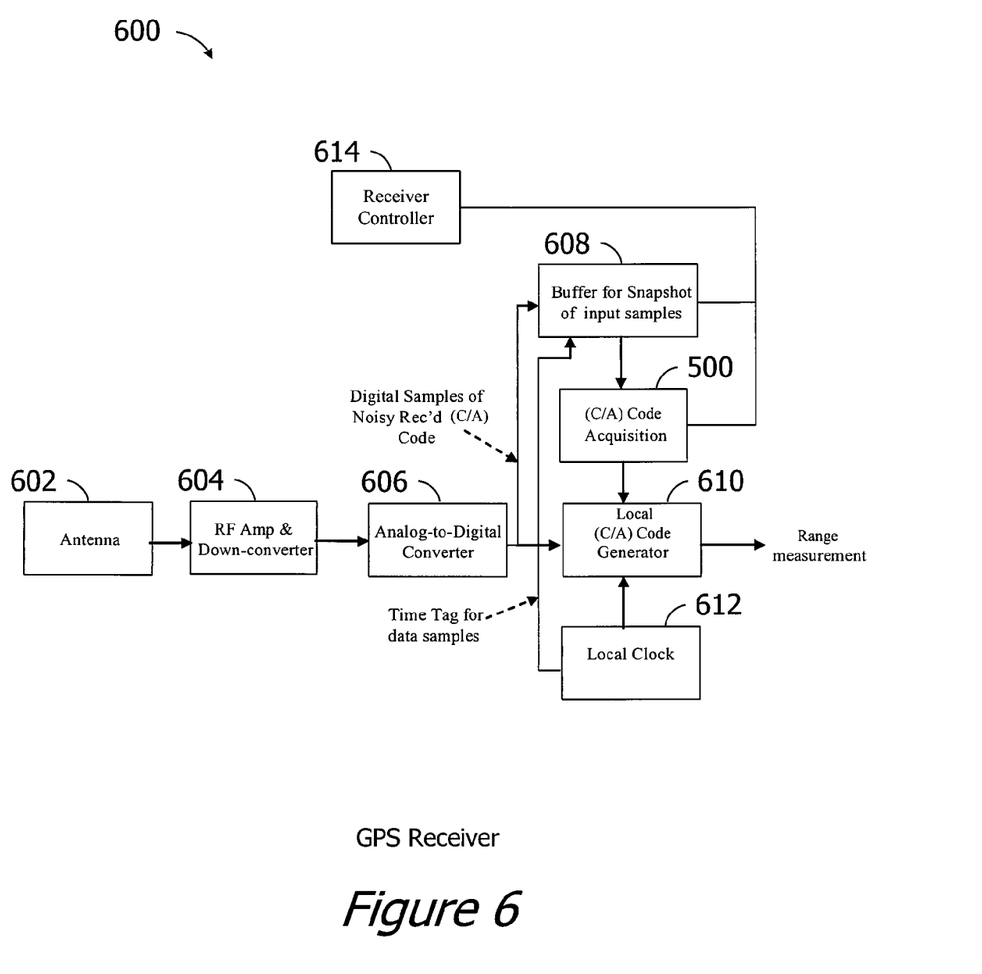
FIG. 6 is a block diagram of an example embodiment of a GPS receiver.

Referring to FIG. 6, in an example embodiment, a GPS receiver 600 includes an antenna 602, a RF amplifier and down-converter 604, an A/D converter 606, a snapshot buffer 608, a (C/A) code acquisition block 500, a local (C/A) code generator 610, a local clock 612 and a receiver controller 614, configured as shown. The functions performed by the various blocks in this diagram are summarized below.

The RF amplifier and down-converter 604 provides an amplified analog signal for subsequent processing. The A/D converter 606 samples the analog signal and provides a snapshot of these digital samples to the snapshot buffer 608. The snapshot buffer 608 time tags a block of samples, stores them, and provides them to the (C/A) code acquisition block 500. Time tagging is done relative to a stable local clock. The (C/A) code acquisition block 500 reads in a block of input data samples from the snapshot buffer 608, and in an example embodiment performs the LDPC decoding function to solve for 20 consecutive C/A code chips. These 20 decoded chips can be used as a fill word for the local (C/A) code generator 610. The local (C/A) code generator 610 reads in the 20-chip fill word from the (C/A) code acquisition block 500. This defines the correct state of the code generator 610 at the time the snapshot data was loaded into the buffer 608. The local (C/A) code generator 610 must now advance its state by the number of clock cycles that have elapsed since the snapshot was taken. It does this by comparing the current reading from the local clock 612 to the clock reading at the time the snapshot was taken and advancing the state of the generator 610 by the corresponding number of chips. The local clock 612 provides a stable source of timing for the receiver 600. The receiver controller 614 provides an overall management function for the GPS receiver 600. For example, the receiver controller 614 tells the snapshot buffer 608 when to load a sample of the input data, and tells the (C/A) code acquisition block 500 when to perform the LDPC decoding function. For simplicity, FIG. 6 does not show the various filtering functions, does not show that the down-converter is tunable to accommodate search over many Doppler bins, and does not show the details of the A/D conversion process.

In an example embodiment, the GPS receiver 600 incorporates the method of C/A code acquisition described herein. The only change (compared to a conventional GPS receiver) is in the C/A Code Acquisition block 500. In a conventional receiver the C/A Code Acquisition function would be done by a FFT-based correlator; in the GPS receiver 600 described herein, this function is done by a LDPC decoder (such as discussed with reference to FIG. 5).

Efficient Encoding of Low Density Parity Check Codes

Other techniques and embodiments described herein pertain to encoding data on a communications channel and, in particular, to providing a LDPC encoder. Low Density Parity Check (LDPC) codes are a class of powerful error correcting codes that have a simple decoder implementation relative to other classes of error correcting codes with comparable error correcting capability.

Figure 7:
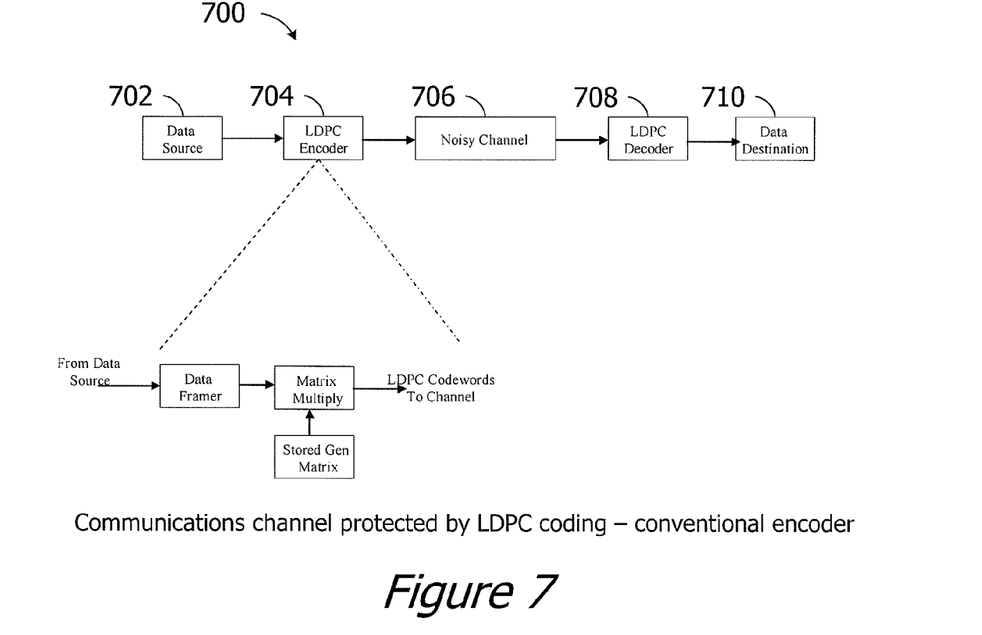
FIG. 7 shows the general flow of data over a channel protected by a LDPC code, encoded by a conventional encoder.

FIG. 7 shows the general flow of data over a channel 700 protected by a LDPC code, utilizing a conventional encoder. In this general channel model there is an information (or data) source 702 that produces a stream of data that is to be transported over a noisy channel 706 to a data destination 710. The conventional LDPC encoder 704 transforms the information bits from the data source 702 into a series of LDPC codewords. Conversely, the LDPC decoder 708 transforms the received, noisy LDPC codewords back into the information bits. If the decoding process is correct, the information bits delivered to the data destination will be error free. If a decoding error is made, then the information bits delivered by the decoder will contain errors.

The conventional LDPC encoder 704 consists basically of a matrix multiplication, in which a block of information bits is multiplied by a generator matrix G to produce the LDPC codeword. There are two significant problems associated with conventional LDPC encoder 704: it is not easy to choose a particular generator matrix G that has good performance, and generating the codeword requires a matrix multiplication of the generator matrix and a block of information bits. Doing matrix multiplications at a high rate to generate the codewords can be a computation burden that requires significant hardware.

Figure 8:
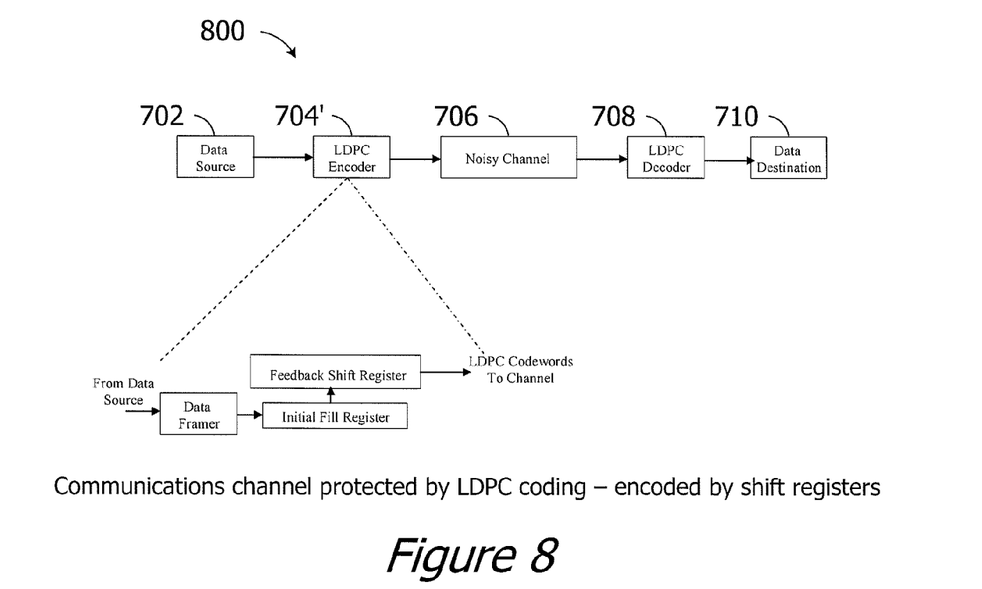
FIG. 8 shows the general flow of data over a channel protected by a LDPC code, encoded by shift registers.

Techniques and embodiments described herein recognize that it is possible to define a certain sub-class of LDPC codes that have the property that a feedback shift register can be used to perform the encoding function. For example, as demonstrated herein, the GPS C/A code, which is a Gold code generated from two 10-stage shift registers, can be described as an LDPC code. Therefore, it follows that if the C/A code is used as the error correcting code in the communications channel, as shown in FIG. 8, the LDPC encoder 704' can be implemented as a simple shift register, eliminating having to figure out how to construct the G matrix and also the matrix multiplications. The sub-class of LDPC codes that can be encoded by shift registers is not limited to just the GPS C/A code, but also includes: Pseudo-random Noise (PN) sequences, Gold Codes and, the more general class of product codes.

Although the present invention has been described in terms of the example embodiments above, numerous modifications and/or additions to the above-described embodiments would be readily apparent to one skilled in the art. It is intended that the scope of the present invention extend to all such modifications and/or additions.

What is claimed is:

1. A method for acquiring Global Positioning System (GPS) code, comprising:
   describing GPS code as a Low Density Parity Check (LDPC) code; and
   decoding the LDPC code to achieve acquisition by directly solving for the correct code phase.

2. The method for acquiring GPS code of claim 1, wherein the GPS code comprises Clear/Acquisition (C/A) code.

3. The method for acquiring GPS code of claim 1, wherein the GPS code comprises Gold code.

4. The method for acquiring GPS code of claim 1, wherein the GPS code comprises product code.

5. The method for acquiring GPS code of claim 1, wherein decoding the LDPC code comprises using an error correction decoding algorithm.

6. The method for acquiring GPS code of claim 1, wherein decoding the LDPC code comprises using a belief propagation algorithm.

7. The method for acquiring GPS code of claim 1, wherein decoding the LDPC code comprises using an iterative algorithm.

8. The method for acquiring GPS code of claim 1, further comprising: pre-screening the GPS code for inversions using a parity check matrix.

9. The method for acquiring GPS code of claim 8, wherein the LDPC code comprises block code that includes the parity check matrix.

10. The method for acquiring GPS code of claim 9, wherein the block code comprises forward error correction (FEC) block code.

11. The method for acquiring GPS code of claim 8, wherein the parity check matrix has an odd number of non-zero terms in each row.

12. The method for acquiring GPS code of claim 8, wherein all rows of the parity check matrix have either 3 or 4 terms.

13. The method for acquiring GPS code of claim 8, wherein the pre-screening is accomplished at a lower signal-to-noise ratio than is needed to decode for the correct code phase.

14. The method for acquiring GPS code of claim 8, further comprising: randomizing the parity check matrix prior to an additional iteration of the decoding.

* * * * *